United States Patent [19]
Ledbetter

[11] 3,818,479
[45] June 18, 1974

[54] DIRECTION FINDER
[76] Inventor: Robert P. Ledbetter, 5208 N. Billen, Oklahoma City, Okla. 13099
[22] Filed: Apr. 17, 1972
[21] Appl. No.: 244,452

[52] U.S. Cl............................................. 343/113 R
[51] Int. Cl............................................. G01s 5/02
[58] Field of Search............................. 343/118, 119

[56] References Cited
UNITED STATES PATENTS
2,710,960  6/1955  Norgorden et al.................. 343/118
3,242,495  3/1966  Kohl ................................... 343/118

Primary Examiner—Maynard R. Wilbur
Assistant Examiner—T. M. Blum
Attorney, Agent, or Firm—Dunlap, Laney, Hessin, Dougherty & Codding

[57] ABSTRACT

An improved direction finder for indicating the direction of a transmitted signal having a signal generating assembly receiving the transmitted signals from a non-directional antenna and a directional antenna, the resultant amplitude variant signal of the received transmitted signals having an actuating null position indicative of an aligned position of the directional antenna with respect to a particular; predetermined transmitted signal. The signal generating assembly produces a pulse output signal in a generating position thereof, responsive to the actuating null position of the resultant amplitude variant signal, and an indicator assembly receives the pulse output signal and provides an indicator output responsive thereto displaying the direction of a particular predetermined transmitted signal, in one form. An actuator signal control assembly is connected to the signal generating assembly and controls the duration of the pulse output signal for resultant amplitude variant signals of varying slopes.

12 Claims, 2 Drawing Figures

DIRECTION FINDER

BACKGROUND OF THE INVENTION

1. Field of the Invention

This invention relates generally to improvements in direction finders and, more particularly, but not by way of limitation, to a direction finder utilizing the signal response from a directional antenna and a non-directional antenna.

2. Description of the Prior Art

In the past there have been various types of direction finders designed to indicate the direction of a transmitted signal with respect to a particular position. One radio type, direction finder, which was proposed in the past, is described in the U.S. Pat. No. 2,232,096, issued to Francis W. Dane. The direction finder of the Dane patent, in one form, utilized a radio receiver for receiving the output signals from a non-directional antenna and a directional antenna of the gonimeter type, the output signal of the radio receiver having some definite frequency and varying in amplitude with the output of the directional antenna. The output signal of the radio receiver was then amplified via a selective amplifier and rectified via a full wave rectifier, the output of the rectifier network being connected to a trigger tube in such a manner that the trigger tube conducted when a minima or negative signal was impressed thereon. The trigger tube was connected to a glow tube of an indicator via a capacitor, the trigger tube discharging the capacitor and lighting the glow tube when the minima signal was impressed on the trigger tube from the full wave rectifier.

One other radio type, direction finder is described in the U.S. Pat. No. 2,710,960, issued to Norgoden et al. The direction finder of the Norgoden patent also utilized the signals from a non-directional antenna and a rotatable antenna (directional antenna) to light a neon bulb on an indicator in such a manner that the position of the lighted bulb on the indicator was indicative of the bearing of the tuned, received radio signal. In this particular direction finder, the signals from the non-directional antenna and the rotatable antenna were each selectively connected to the input of a receiver wherein each signal was converted to an intermediate frequency and amplified, the signal output of the receiver being connected to a discriminator which rectified each signal applied thereto. The separate identity of the signal received from the non-directional antenna and the signal received from the directional antenna was maintained via a first switching network, interposed between the antennas and the receiver, and a second switching network, interposed between the receiver and the discriminator, the first and the second switching networks each being operated by or responsive to a common, square wave generator. The two rectified voltage outputs from the discriminator were each applied to a relay circuit which was constructed to produce a pulse for lighting a neon bulb on the indicator when the rectified voltage output from the directional antenna dropped below the rectified voltage from the non-directional antenna.

The direction finders described in the Dane patent and in the Norgoden patent, each included a pair of synchronously driven motors, one motor for driving the directional antenna and one motor for driving a disc on the indicator. The direction finders described in each of these patents also utilized a rectified voltage output for comparing the signals received from the non-directional antenna and the directional antenna, and then utilized the result of this comparison for lighting or otherwise activating the indicators.

SUMMARY OF THE INVENTION

An object of the invention is to provide a directional finder for more accurately and efficiently indicating the direction of a transmitted signal.

Another object of the invention is to provide a less complex, more accurate and efficient apparatus for identifying the null position of a signal of varying amplitude.

One other object of the invention is to provide a less complex, more accurate and efficient apparatus for producing an output signal responsive to the null position of a received signal of varying amplitude.

Yet another object of the invention is to provide a less complex, more accurate and efficient apparatus for identifying and producing output signals responsive to null positions of received signals of varying intensities, amplitudes and slopes.

Another object of the invention is to provide a direction finder which is economical in construction and operation thereof.

One additional object of the invention is to provide a direction finder which is less complex and more reliable in operation.

Other objects and advantages of the invention will be evident from the following detailed description when read in conjunction with the accompanying drawings which illustrate various embodiments of the invention.

DESCRIPTION OF THE PREFERRED EMBODIMENT

Figure 1:
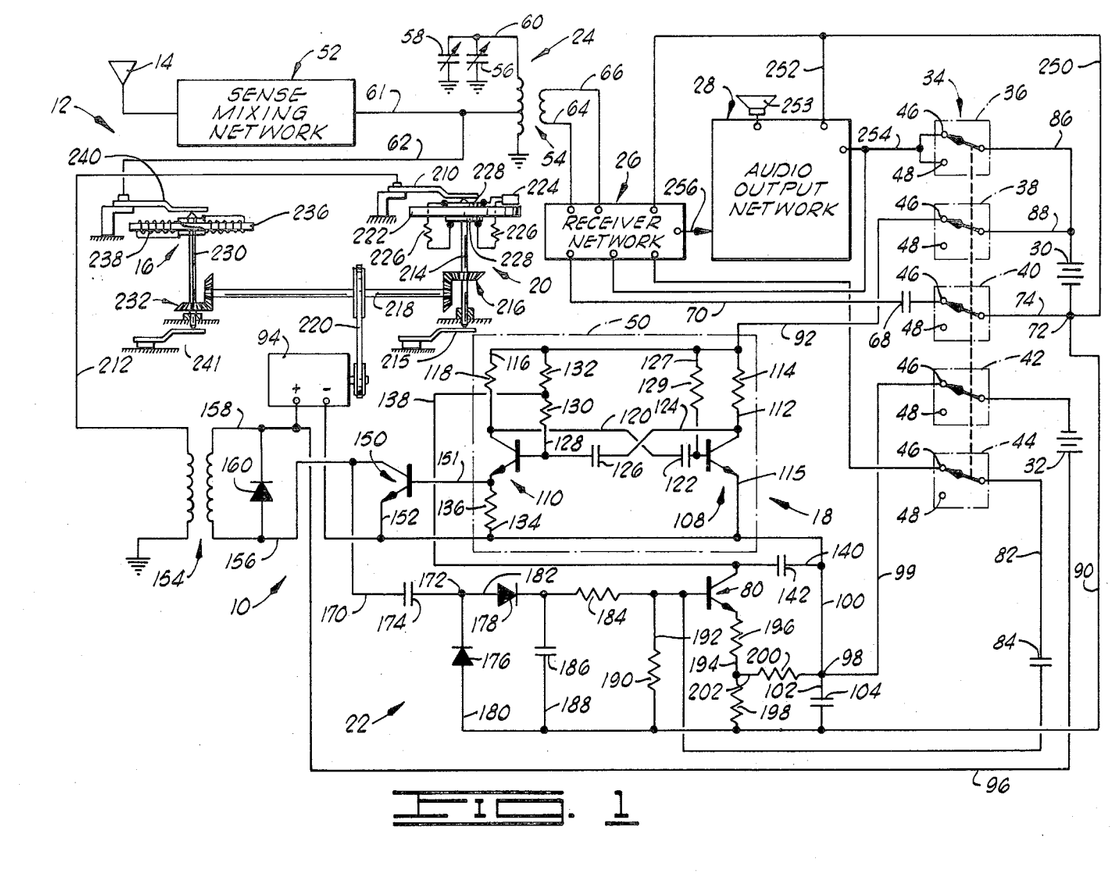
FIG. 1 is a partial schematic, partial diagrammatical view of the direction finder of the present invention.

Referring to the drawings, in general, and to FIG. 1, in particular, shown therein and designated by the general reference numeral 10 is a direction finder which generally includes: an antenna assembly 12 for receiving selected, predetermined transmitted signals having a non-directional type of antenna 14 and a rotatably supported directional antenna 16; a signal generating assembly 18 which receives the transmitted signals from the antenna assembly 12 through the receiver network 26 and generates an actuator signal responsive thereto, in a pulse generating position thereof; an indicator assembly 20 which receives the actuator signal from the signal generating assembly 18 and provides an indicator output responsive thereto; and an actuator signal control assembly 22 connected to the signal generating assembly 18 which holds the signal generating assembly 18 in a pulse generating position for a controlled period of time to assure a predetermined duration of the actuator signal, for reasons and in a manner which will be described in greater detail below.

The non-directional antenna 14 has a response which is essentially independent of the direction from which the predetermined transmitted signal is received thereby. The directional antenna 16, however, is constructed such that its response is directional and the amplitude of the predetermined transmitted signal received thereby is thus varying as the orientation of the directional antenna 16 with respect to the transmitter source producing the predetermined transmitted signal is varied, the amplitude of the received, predetermined transmitted signal having or going through two maximum and two minimum amplitude positions for each revolution of the directional antenna 16. In the direction finder 10, the received, predetermined transmitted signals from the non-directional antenna 14 and the directional antenna 16 are combined with the use of the sense mixing network and the tuning network and coupled through the receiver network, to be described below, to the signal generating assembly 18, the combined signals from the non-directional antenna 14 and the directional antenna 16 producing an effective amplitude curve having only one minimum amplitude position for each revolution of the directional antenna 16, the effective amplitude curve being referred to sometime herein as the "resultant amplitude signal" or "resultant amplitude variant signal" for the purpose of indentification. The minimum amplitude position of the resultant amplitude variant signal is sometimes referred to below as the "actuating null position" of the received, predetermined transmitted signal or, in other words, the resultant amplitude variant signal, and, in a broader sense, the term "actuating null position" of the received, transmitted signals is utilized below to designate an identifiable period of a resultant amplitude variant signal which is indicative of the direction of the received transmitted signal, since various other types of antenna assemblies may be utilized in the direction finder 10.

The non-directional antenna 14 could, in some applications, be eliminated and the resultant amplitude variant signal from only the directional antenna 16 utilized to indicate the direction of the received, predetermined transmitted signal. It should be noted, however, that, in this latter-mentioned form of the invention, the resultant amplitude would have two actuating null positions for each revolution of the directional antenna 16.

The signal generating assembly 18, more particularly, includes: a tuning network 24, which is connected to the antenna assembly 12 and is adjustable to various tuned positions, each tuned position corresponding to the frequency of a selected, predetermined transmitted signal; a receiver network 26 which is connected to the antenna assembly 12 via the tuning network 24 for receiving and amplifying the selected, predetermined transmitted signal therefrom; an audio output network 28 which is connected to the receiver network 26, in one position of the direction finder 10, for receiving the amplified, predetermined transmitted signal therefrom and providing an audio output responsive thereto; an operating power supply 30 and an operating power supply 32; a switch assembly 34 having a direction finder on or function position 46, a radio on or receiving function position 48 and an off position, and the switch arms of each switch 36, 38, 40, 42 and 44 being interconnected for simultaneous operation thereof; and a pulse generating assembly 50 for generating a pulse output signal in an operating position thereof, the pulse output signal actuating the indicator assembly 20 and thus constituting the actuator signal of the signal generating assembly 18.

A sense mixing network 52 is interposed between the non-directional antenna 14 and the tuning network 24. The sense mixing network 52 is constructed to trim or adjust the phase shift and the amplitude of the transmitted signal received by the non-directional antenna 14 so that the received, transmitted signals from the non-directional antenna 14 and the directional antenna 16 are additive in the proper amplitude and the proper phase to produce the desired resultant variant amplitude signal for the operation of the direction finder 10. Networks constructed to operate in a manner similar to that described above with respect to the sense mixing network 52 are well known in the art and, in view of the detailed description of the direction finder 10 contained herein, a detailed description of the various components and the interconnections thereof is not required herein.

The tuning network 24, more particularly, includes a transformer 54 for coupling the received, transmitted signal to the receiver network 26, and a trimming capacitor 56 connected in parallel with a variable tuning capacitor 58, the trimming capacitor 56 and the variable tuning capacitor 58 each being connected in parallel with the primary coil of the transformer 54 via conductor 60. The trimming capacitor 56, the variable tuning capacitor 58 and the transformer 54 each cooperate to form the tuning network 24 so the direction finder 10 can be selectively tuned to a particular, predetermined transmitted signal by varying the variable tuning capacitor 58, in a manner well known in the art.

More particularly, the non-directional antenna 14 and the directional antenna 16 are connected to the primary coil of the transformer 54 via conductors 61 and 62, respectively, and the sense mixing network 52 is interposed in the conductor 61. The output signal of the tuning network 24 is connected to the receiver network 26 via conductors 64 and 66, each conductor 64 and 66 connecting the secondary coil of the transformer 54 to the receiver network 26.

The receiver network 26, in one form, generally includes: one or more radio frequency (R-F) amplifier stages, a converter-oscillator stage and one or more intermediate frequency (I-F) amplifier stages, the various stages of the receiver network 26 being well known in the art. Since the audio portion or intelligence contained in the predetermined transmitted signal is not utilized to generate the actuator signal of the signal generating assembly 18, it is not necessary that the various stages of the audio portion of a typical receiver be included in the receiver network 26.

It should be noted that a receiver network, constructed similar to that described above with respect to the receiver network 26, generally includes apparatus for automatically regulating the gain of the receiver so that the output of the receiver will tend to remain constant though the incoming signal may vary in strength, the automatic gain control apparatus generally regulating the gain of the R-F and I-F amplifier stages. A capacitor 68 is connected to the receiver network 26 and to the direction finder function position 46 of the switch 40, via a conductor 70, the switch 40 being connected to the terminal 72 via a conductor 74. The capacitor 68 is, more particularly, connected to the automatic gain control apparatus of the receiver network 26 to increase the total capacitance thereof in a direction finder function position 46 of the switch 40, thereby increasing the time constant of the automatic gain control apparatus during the direction finder function of the direction finder 10.

The amplified signal output of the receiver network 26 is connected to the base of an amplifier 80 via a conductor 82, the amplified signal output of the receiver network 26 being, in a preferred form, taken from the output of the intermediate frequency amplifier stage thereof prior to the detector. The switch 44 is interposed in the conductor 82, and a capacitor 84 is interposed in the conductor 82, generally between the switch 44 and the amplifier 80. The capacitor 84 couples the resultant amplitude variant signal from the receiver network 26 to the amplifier 80, thereby coupling the R-F signal to the amplifier 80. The capacitor 84 also functions as a part of the actuator signal control assembly 22, in a manner which will be described in greater detail below.

The terminal 72 is connected to the negative side of the power supply 30, the positive side of the power supply 30 being connected to the switches 36 and 38 via conductors 86 and 88, respectively. A conductor 90 connects the terminal 72 to the signal generating assembly 18 and the actuator signal control assembly 22.

The direction finder function position 46 of the switch 38 is connected to the pulse generating assembly 50 via a conductor 92, the switch 38 establishing electrical communication between the power supply 30 and the pulse generating assembly 50 in a direction finder function position 46 of the switch 38. The power supply 30 thus provides operating power for the pulse generating assembly 50 during the operation of the direction finder 10.

The positive side of the power supply 32 is connected to a motor 94 via conductor 96, and the negative side of the power supply 32 is connected to a terminal 98 via a conductor 99. The switch 42 is, more particularly, interposed in the conductor 99 to establish electrical communication between the power supply 32 and a portion of the signal generating assembly 18 and a portion of the indicator assembly 20, in the direction finder function position 46 of the switch 42, for reasons which will become more apparent below.

The terminal 98 is connected to the motor 94 via a conductor 100, and to portions of the pulse generating assembly 50, thereby providing a common connection therefor. The terminal 98 is also connected to the conductor 90 via a conductor 102, and a capacitor 104 is interposed in the conductor 102.

The pulse generating assembly 50 generally includes a pair of transistor amplifiers 108 and 110. The collector of the transistor 108 is connected to the conductor 92 via a conductor 112, a resistor 114 being interposed in the conductor 112, and the collector of the amplifier 110 is connected to the conductor 92 via a conductor 116, a resistor 118 being interposed in the conductor 116. The base of the amplifier 108 is connected to the collector of the amplifier 110 via a conductor 120, a capacitor 122 being interposed in the conductor 120, and the base of the amplifier 110 is connected to the collector of the amplifier 108 via a conductor 124, a capacitor 126 being interposed in the conductor 124. The base of the amplifier 108 is connected to the conductor 92 via a conductor 127, and a resistor 129 is interposed in the conductor 127, as shown in the drawing.

The amplifiers 108 and 110 are thus connected to the power supply 30, and the capacitors 122 and 126 interconnect the amplifiers 108 and 110 to form a network commonly referred to in the art as a "free running multi-vibrator," the power supply 30 providing the basic operating power therefor. The pulse generating assembly 50 will thus continuously generate a pulse output signal in an operating position thereof as long as the bases of the transistor amplifiers 108 and 110 sequentially have a forward bias impressed thereon, the free running multi-vibrator type of network being well known in the art.

A conductor 128 is connected to the base of the amplifier 110 and to the conductor 92, the conductor 128 being, more particularly, connected to the conductor 124. A pair of resistors 130 and 132 are interposed in series in the conductor 128. The emitter of the transistor amplifier 110 is connected to the conductor 100 via a conductor 134, and a resistor 136 is interposed in the conductor 134. The pulse output signal of the pulse generating assembly 50 is thus impressed generally across the resistor 136.

As mentioned before, the amplifiers 108 and 110 of the pulse generating assembly 50 require a sequential forward bias on the base thereof to remain in an operating position generating the pulse output signal across the resistor 136. A conductor 138 is connected to the conductor 128, generally between the resistors 130 and 132, and to the collector of the amplifier 80, the collector of the amplifier 80 also being connected to the conductor 100 via a conductor 140 through a capacitor 142 interposed in the conductor 140. The amplifier 80 is thus connected to the pulse generating assembly 50 such that when the amplifier 80 is not conducting or, in other words, in a non-conducting status or position of the amplifier 80, a forward bias is impressed on the base of the amplifier 110, and such that, in a conducting status or position of the amplifier 80, a reverse bias is impressed on the base of the amplifier 110, thereby positioning the pulse generating assembly 50 in a non-operating position. The conducting status of the amplifier 80 thus controls the operative status of the pulse generating assembly 50 during the operation of the direction finder 10, in a manner and for reasons which will be described in greater detail below.

The pulse output signal of the pulse generating network 50 is connected to the base of a switching transistor 150 via a conductor 151, the emitter of the switching transistor 150 being connected to the conductor 100 via a conductor 152. The collector of the switching transistor 150 is connected to the primary coil of a pulse transformer 154 via a conductor 156, the pulse transformer 154 being connected to conductor 96 via a conductor 158, and a diode 160 being connected to the conductors 156 and 158 in parallel with the primary coil of the pulse transformer 154.

The pulse output signal of the pulse generating assembly 50 thus provides the base biasing current for operating the switching transistor 150, the switching transistor 150 being driven into conduction during the duration of each pulse output of the pulse generating assembly 50 at predetermined times during the operation of the direction finder 10. The output pulse signal of the pulse generating assembly 50 is also coupled to the indicator assembly 20 via the switching transistor 150 and the pulse transformer 154, the output signal of the switching transistor 150, more particularly, defining the actuator signal for operating a portion of the indicator assembly 20 of the direction finder 10.

The collector of the switching amplifier 150 is also connected to the actuator signal control assembly 22 via a conductor 170, which is connected to a terminal 172. A capacitor 174 is interposed in the conductor 170, generally between the switching transistor 150 and the terminal connection 172.

A pair of diodes 176 and 178 are each connected to the terminal 172 via conductors 180 and 182. The diodes 176 and 178 are orientated to define separate charging and discharging paths for a portion of the actuator signal control assembly 22, for reasons and in a manner to be described in greater detail below.

The diode 178 is connected to the base of the amplifier 80, and a resistor 184 is interposed in the conductor 182, generally between the diode 178 and the amplifier 80. A step charging capacitor 186 is connected to the conductor 182, generally between the diode 178 and the resistor 184, and to the conductor 90 via a conductor 188, and a resistor 190 is connected to the conductor 182, generally between the resistor 184 and the amplifier 80, and to the conductor 90 via a conductor 192.

The actuator signal control assembly 22, more particularly, includes a sensing network for holding the signal generating assembly 18 in one generating position for a predetermined duration when the received, resultant amplitude variant signal has a maximum slope; and a regulating network for holding the signal generating assembly 18 in another generating position for a predetermined duration when the received, resultant amplitude variant signal has a minimum slope. The actuator control assembly 22 operates to balance the conducting position of the amplifier 80 to assure an actuator signal of a predetermined duration for the various received, resultant amplitude variant signals over a range generally between strong signal maximum slope and weak signal minimum slope conditions, described above. It should also be noted that the terms "sensing" and "regulating" are used herein in connection with the sensing network and the regulating network merely for the purpose of network or circuit identification.

The sensing network includes the capacitor 84 and the amplifier 80. The capacitor is connected to the input of the amplifier 80, and the capacitor is sized such that the sensing network has a relatively long time constant sensing the actuating null position of a resultant amplitude variant signal at a threshold determined by the regulating network.

The regulating network includes the capacitor 174, the diodes 176 and 178, the step charging capacitor 186, the switching transistor 150, resistors 184 and 190 and capacitor 84. The capacitors 174 and 186 are each connected to the output of the switching transistor 150 such that the capacitors 174 and 186 are each charged when the switching transistor 150 is in the off position, the collector of switching transistor 150 being positive with respect to the emitter in the off position thereof, and the capacitors 174 and 186 being charged via the charge path provided by the diode 178. When the switching transistor 150 is in the on position, the collector potential moves in a negative direction toward the potential of the emitter, and the capacitor 174 is discharged via the discharge path provided by the diode 176, the charge on the step charge capacitor 186 being decreased during the discharging of the capacitor 174 by the specific discharging path provided by the resistors 184 and 190 and the base current of the amplifier 80.

In the off position of the switching transistor 150, the capacitors 174 and 186 are each charged to a potential inversely proportional to the respective capacitance values thereof, the step charging capacitor 186 having a higher capacitance value with respect to the capacitor 174, and thus being charged to a lesser potential during each charging cycle. More particularly, the step charging capacitor 186, resistors 184 and 190 and capacitor 84 are sized to stabilize after being charged to a predetermined level, corresponding to a predetermined number of pulse output signals generated from the pulse generating assembly 50 for a given actuating null slope. The charge on capacitor 84 biases the amplifier 80 to drive the amplifier 80 into a conducting position, thereby positioning the pulse generating assembly 50 in the non-operating position, when the step charge capacitor 186 is charged. Thus, the regulating network compensates for the changes in duration of the actuating null position of a resultant amplitude variant signal having varying slopes, thereby assuring an actuator signal of a predetermined number of pulses and thus a predetermined duration. The resistors 184 and 190 in conjunction with the capacitor 84 serve as an integrating network following the step changing network comprising the sensing network and the regulating network.

The emitter of the amplifier 80 is connected to the conductor 90 via a conductor 194, and a pair of resistors 196 and 198 are interposed in the conductor 194. A resistor 200 is connected to the conductor 194 via a conductor 202, generally between the resistors 196 and 198, the conductor 202 also being connected to the terminal 98.

As mentioned before, the resultant amplitude signal, in a preferred form, has a single actuating null position for each revolution of the directional antenna 16, the term "null position," more particularly, referring to a minimum amplitude position and the term "actuating null position," more particularly, referring to the period of time, generally before and after the point of minimum amplitude of the resultant amplitude signal, wherein the signal generating assembly 18 is positioned in a generating position for generating the actuator signal to actuate the indicator assembly 20. In practice, the resultant amplitude variant signal curve will decrease in amplitude at a particular decreasing slope toward the null position or minimum amplitude position, pass through the null position, and increase in amplitude at a particular increasing slope toward the maximum amplitude. The actuating null position of the resultant amplitude variant signal will thus extend from a predetermined amplitude point on the portion of resultant amplitude variant signal curve having a decreasing slope to substantially the same predetermined amplitude point on the portion of the resultant amplitude variant signal curve having an increasing slope.

The resultant amplitude variant signals are coupled to the base of the amplifier 80, as described before, and the amplifier 80 is constructed to be biased in a conducting position and a non-conducting position in response to the amplitude level of a particular resultant amplitude signal received thereby. For example, and, assuming the direction finder did not include an actuator control assembly 22, the amplifier 80 would be biased in a conducting position during those periods of time extending generally between a time immediately after the amplitude of the resultant amplitude signal increased beyond the actuating null position and a time immediately prior to the amplitude of the resultant amplitude variant signal decreased to the actuating null position, thereby impressing reverse bias on the base of the amplifier 110 of the pulse generating assembly 50 to position the pulse generating assembly 50 in a non-operating position thereof. By the same token, the amplifier 80 would be biased in a non-conducting position during those periods of time when the amplitude of the resultant amplitude variant signal was within the actuating null position, thereby leaving a forward bias on the base of the amplifier 110 of the pulse generating assembly 50 to position the pulse generating assembly 50 in an operating position thereof and to position the signal generating assembly 18 in a generating position generating the actuator signal.

In the operation example described above wherein the direction finder 10 did not include the actuator signal control assembly 22, the pulse generating assembly 50 does provide a pulse output signal during the actuating null position of the resultant amplitude variant signal, the output thereof thus being indicative, to some extent, of the direction of the received, transmitted signal. In practice, however, the direction finder 10 will, of course, be utilized to identify the direction of various transmitted signals, and the actual increasing and decreasing slopes of the various resultant amplitude variant signals produced therefrom will vary considerably over a wide range between what may be referred to as a maximum or "fast slope" wherein the resultant amplitude variant signal decreases in amplitude to a null position and increases therefrom in a relatively minimum amount of time, and what may be referred to as a minimum or "slow slope" wherein the resultant amplitude variant signal decreases in amplitude to a null position and increases therefrom in a relatively maximum amount of time. Thus, utilizing only the amplifier 80 and the pulse generating assembly 50 to generate an actuator signal, the amplifier 80 will be biased in the non-conducting position for a relatively short, minimum period of time or not at all when receiving a strong transmitted signal with a resultant amplitude variant signal having a maximum slope, and will be biased in the non-conducting position for a relatively long, maximum period of time when receiving a weak transmitted signal with a resultant amplitude variant signal having a minimum slope. The duration of the generated actuator signal generated under either of the last-mentioned conditions would generally be too long or too short for positive, efficient direction indication, and the direction finder 10 thus includes the actuator signal control assembly 22 for holding the signal generating assembly 18 in a generating position and, more particularly, for holding the pulse generating assembly 50 in an operating position for a predetermined duration to assure a generated actuator signal of a predetermined duration during the operation of the direction finder 10, thereby assuring a positive, predetermined constant indicator output indicative of the direction of the received, predetermined transmitted signal relative to the direction finder 10 location.

One side of the secondary coil of the pulse transformer 154 is connected to a spring contact 210 of the indicator assembly 20 via a conductor 212, the other side of the secondary coil being returned to ground. The spring contact 210 is biased into contact with one end of a two part insulated indicator shaft 214, the biased contact between the spring contact 210 and the upper part of the indicator shaft 214 maintaining electrical continuity therebetween in a rotating position of the upper part of the indicator shaft 214. A second spring contact 215 is biased into contact with the other end of the two part insulated indicator shaft 214 and is returned to ground. The indicator shaft 214 is gearingly connected via a bevel gear assembly 216 to a drive shaft 218, the drive shaft 218 being drivingly connected to the motor 94 via a pulley-wheel belt connector 220, the motor 94 rotatingly driving the indicator shaft 214 in an actuated position of the motor 94.

A disc 222 is connected to the indicator shaft 214, the disc 222 being rotated therby during the operation of the direction finder 10. A light source 224 is securedly positioned to the disc 222, the light source 224 being, of course, rotated by the disc 222. A pair of resistors 226 are each connected to a pair of bushings 228, one of the resistors 226 being connected to each of the bushings 228 and one of the resistors 226 being connected to the light source 224 and one of the bushings 228, and the bushings 228 maintaining electrical continuity with each insulated part of the indicator shaft 214 in a rotating position of the indicator shaft 214. The light source 224 of the indicator assembly 20 is thus connected to the signal generating assembly 18 and, more particularly, the light source 224 is coupled to the output of the switching transistor 150 via the pulse transformer 154, the light source 224 being lighted by the actuator signal generated via the pulse generating assembly 50 in a generating position thereof.

The directional antenna assembly 16 includes an antenna shaft 230 which is gearingly connected to the drive shaft 218 via a bevel gear assembly 232, the antenna shaft 230 being rotatingly driven via the motor 94 in an actuated position of the motor 94.

The directional antenna, in one form as shown in the drawing, includes a ferrite bar 236 having a coil 238 wound thereabout, the bar 236 being secured to the two part antenna shaft 230. The directional antenna and, more particularly, the bar 236 is rotatingly driven via the motor 94, during the operation of the direction finder 10, and a spring contact 240 is biased into contact with one end of the antenna shaft 230, the biased contact between the spring contact 240 and the upper part of the antenna shaft 230 maintaining electrical continuity therebetween during the rotation of the antenna shaft 230, the spring contact 240 being connected to the conductor 62 connecting the directional antenna 16 to the tuning assembly 24. A second spring contact 241 is biased into contact with the other end of the two part insulated antenna shaft 230 and is returned to ground.

The audio output network 28 of the direction finder 10 is connected to the terminal 72 via a conductor 250 and a conductor 252, the conductor 250 also being connected to the receiver network 26. A speaker 253 is connected to the audio output network 28 as shown in the drawing.

The audio output network 28 and the receiver network 26 are connected to the power supply 30 via a conductor 254 which is connected to the direction finder function position 46 and the radio receiving function position 48, the audio output network 28 being constructed for receiving a detected R-F output signal 256 from the receiver network 26 and providing an audible output signal responsive thereto via the speaker 253. In one form, the audio output network 28 typically includes an amplifier network amplifying the detected R-F signal to provide an output signal responsive to the signal received via the antenna system 12 and that signal being then amplified and audibly reproduced via the amplifier and the speaker, in a manner well known in the art.

The switch 34 is interposed in the direction finder 10 such that in a direction finder function position 46 thereof, as shown in the drawing, the capacitor 68 is connected to the automatic gain control network of the receiver 26; the power supply 30 is connected to the receiver network 26, the audio output network 28 and the pulse generating assembly 50 to provide positive operating power therefor; the power supply 32 is connected to the motor 94 and to a portion of the signal generating assembly 18; and the output signal from the receiver network 26 is coupled to the amplifier 80. In the radio receiving function position 48 of the switch 34, the power supply 30 is connected to the receiver network 26 and to the audio output network 28 to provide operating power therefor, the direction finder 10 functioning as a radio in this position of the switch 34.

OPERATION OF THE PREFERRED EMBODIMENT

The direction finder 10 is constructed to receive transmitted signals and to provide an output indication of the direction of such received, transmitted signal relative to the location of the direction finder 10. The direction finder 10 thus provides a compact, efficient, reliable, and positive apparatus useful in connection with the operation of ship and aircraft or the like for obtaining a bearing indication.

To initiate the operation of the direction finder 10, the switch assembly 34 is moved to the direction finder function position 46, and the tuning assembly 24 is then tuned to a selected, predetermined transmitted signal by adjusting the variable tuning capacitor 58, the predetermined transmitted signal being transmitted from a known or identifiable source, in a preferred form. The pulse generating assembly 50 is connected to the power source 30 when the switch assembly 34 is initially moved to the direction finder function position 46; however, the operation of the pulse generating assembly 50 is controlled via the amplifier 80, in a manner described in detail above.

The transmitted signal thus selected is received by the non-directional antenna 14 and the directional antenna 16, the transmitted signals thus received being coupled to the receiver network 26 and amplified thereby. The amplified, transmitted signal from the receiver network 26 is coupled to the base of the amplifier 80, and the amplifier 80 is thus biased into a conducting and a non-conducting position following the amplitude variations of the resultant amplitude variant signal of the transmitted signal, the amplifier 80 being biased in the non-conducting position during the actuating null positions of the resultant amplitude variant signal to bias the signal generating assembly 50 in the generating position thereof. The signal generating assembly 50 thus generates a pulse output signal each time the resultant amplitude variant signal goes through an actuating null position. The pulse output signal of the pulse generating or, more particularly, the pulse output of the switching amplifier 150 providing the actuator signal for lighting the light source 224 of the indicator assembly 20, the light source 224 being thus lighted via a pulse type actuator signal each time the resultant amplitude variant signal goes through an actuating null position. Further, since the actuating null positions of the resultant amplitude variant signal are indicative of an aligned position of the directional antenna 16 with the received, predetermined transmitted signal, the output signal of the indicator assembly 20 is responsive to and indicative of the direction of the transmitted signal source with respect to the location of the direction finder 10. As described before, the term "predetermined transmitted signal" or "transmitted signal", as used herein, designates a signal which the direction finder 10 has been tuned to receive the signal transmitted from a particular transmitter location; the term "resultant amplitude variant signal" or simply "the resultant amplitude signal," as used herein, designates an effective wave form representing the amplitude variation of the transmitted signal received from the non-directional antenna 14 and the directional antenna 16 as the directional antenna rotates; and the term "actuating null positions" designating those portions of the resultant amplitude curve wherein the amplitude thereof is below a predetermined amplitude value, in a preferred form, and, in an alternate form, more generally, designating those portions of the resultant amplitude curve of a received, transmitted signal which are indicative of the direction of the received, predetermined transmitted signal.

Since a single, light source 224 is utilized to provide the output indication signal, in the preferred embodiment, the disc 222 supporting the light source 224 is rotated during the operation of the direction finder 10 and the signal generating assembly 10 is constructed to light the light source 224 at predetermined positions with respect to the axis of rotation of the disc 222 defined by the indicator shaft 214 during the rotation thereof. Thus, the duration of the actuator signal must be sufficiently long to produce an output indication signal which is clearly visible, and yet the output indication signal must be of a sufficiently short duration to produce an indication having a clearly identifiable and definite position, since the position of the lighted light source 224 with respect to the axis of rotation thereof is indicative of the direction of the received, transmitted signal.

The above considerations relating to the duration of the indication output signal are accomplished in the direction finder 10 by balancing and calibrating the speed of rotation of the disc 222 with the duration of the actuator signal generated by the signal generating assembly 18, the duration of the actuator signal being positively and accurately controlled via the actuator signal control assembly, in a manner described in detail before. For example, in one application, the disc 222 of the indicator assembly 20 was rotated at a speed of 500 revolutions per minute, and various components of the signal generating assembly 18 and the actuator signal control assembly 22 were sized such that an actuator signal having six pulses per revolution of the disc 222 was generated thereby. The output indication signal of the light source 222, in this instance, was found to produce an identifiable, positive, reliable, definite, and visible indication of the direction, the indicator assembly 20 having a dial, calibrated in degrees, disposed near the disc 222 so the indication output signal was alignable therewith for obtaining a direct bearing reading therefrom; and the size of some of the components utilized in this example were as follows:

1. Capacitor 84—0.82 microfarad
2. Resistor 184—220 kilohms
3. Resistor 190—220 kilohms
4. Capacitor 186—2.2 microfarad
5. Capacitor 174—0.068 microfarad
6. Capacitor 122—0.013 microfarad
7. Capacitor 126—0.01 microfarad
8. Resistor 114—4.7 kilohms
9. Resistor 130—22 kilohms
10. Resistor 132—22 kilohms
11. Resistor 118—4.7 kilohms
12. Resistor 129—4.7 kilohms When the switch assembly 34 is moved to the radio receiving function position 48, the electrical continuity in the conductor 70 is interrupted to disconnect the capacitor 68 from the receiver network 26; the electrical continuity in the conductor 82 is interrupted to disconnect the receiver network 26 from the amplifier 80; the electrical continuity in the conductor 96 is interrupted to disconnect the power supply 32 from the motor 94 and the signal generating assembly 18; and electrical continuity in the conductor 92 is interrupted to disconnect the power supply 30 from the pulse generating assembly 50. In this position of the switch assembly 34, the antenna system 12, the tuning network 24, the receiver network 26, the audio network 28 and the power supply 30 each cooperate to produce an audible output responsive to the tuned, transmitted signal, the direction finder 10 essentially functioning as a typical radio-receiver.

Figure 2:
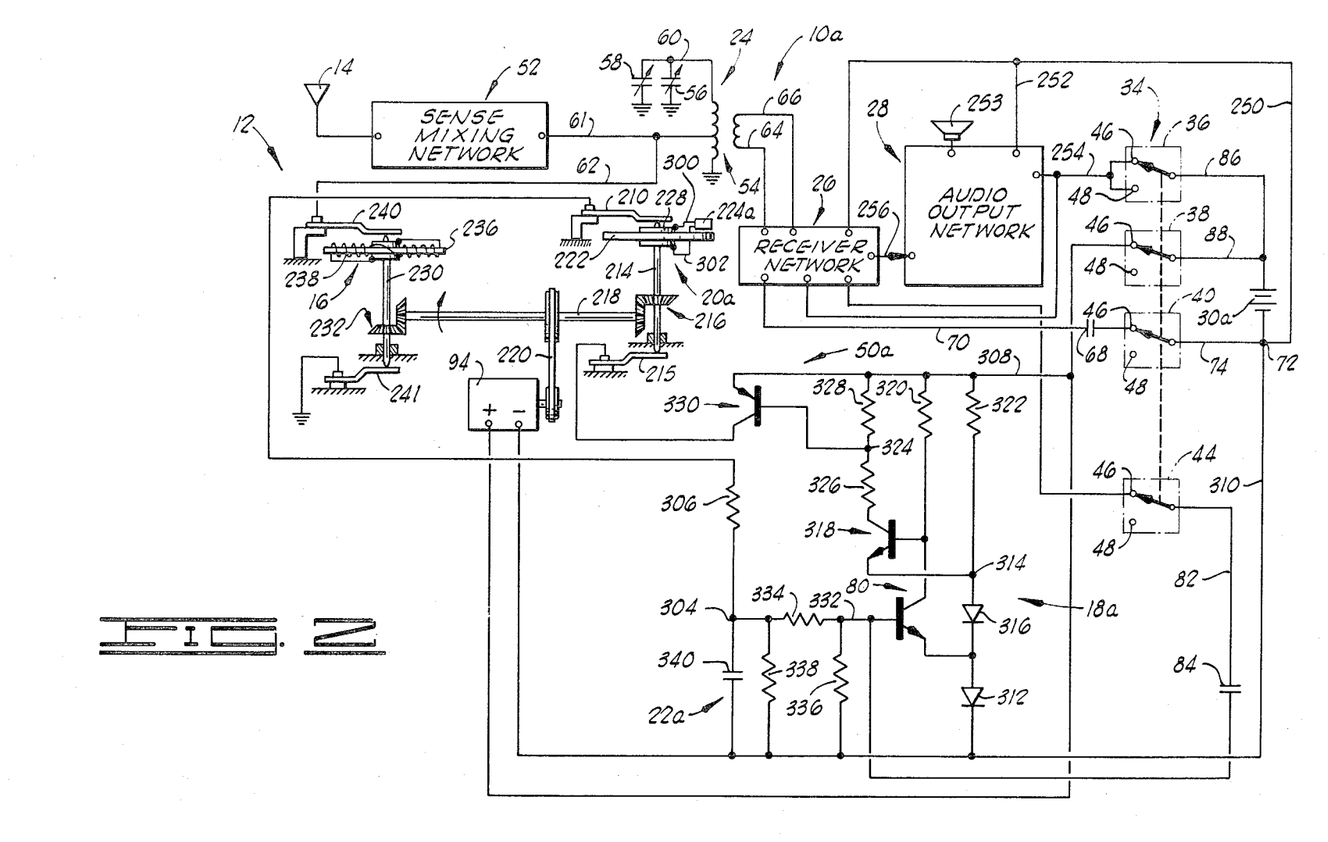
FIG. 2 is a partial schematic, partial diagrammatical view, similar to FIG. 1, but showing a modified direction finder.

EMBODIMENT OF FIG. 2

Shown in FIG. 2 is a modified direction finder 10a utilizing a modified light source 224a which is, more particularly, a light emitting diode 224a, modified signal generating assembly 18a, and a modified activator signal control assembly 22a. The modified signal generating assembly 18a is constructed to receive the predetermined transmitted signals from the receiver network 26 and to generate an activator signal responsive to the actuating null positions of the resultant amplitude variant signal in a generating position thereof, and the modified actuator signal control assembly 22a is constructed to hold the signal generating assembly 18a in a generating position for a predetermined duration to control the duration of the actuator signal, in a manner similar to that described before with respect to the signal generating assembly 18 and the actuator signal control assembly 22, shown in FIG. 1 and in a manner to be described in greater detail below.

The indicator assembly 20a is constructed similar to the indicator assembly 20, shown in FIG. 1 and described before, the salient difference being that the indicator assembly 20a includes the light emitting diode 224a. The light emitting diode 224a is supported on the disc 222 and connected directly to the bushings 228 via the conductors 300 and 302, and one side of the spring contact 210 is connected to a junction 304 via a resistor 306.

The amplified signal output of the receiver network 26 is connected to the base of the amplifier 80 via the conductor 82 in a manner similar to that described before with respect to the direction finder 10, shown in FIG. 1. The power supply 30a is connected to the signal generating assembly 18a, and to the actuator signal control assembly 22a via conductors 308 and 310, the conductor 310 being connected to the junction 72 and the switch 38 being interposed in the conductor 308. The conductors 310 and 308 are connected to the motor 94, thereby connecting the power supply 30a to the motor 94. The direction finder 10a thus utilizes a single power supply 30a in lieu of the two power supplies 30 and 32 of the direction finder 10, shown in FIG. 1.

The emitter of the amplifier 80 is connected to the conductor 310 via a diode 312 and to a junction 314 via a diode 316. The collector of the amplifier 80 is connected to the base of a transistor intermediate amplifier 318, the base of the intermediate amplifier 318 being connected to the conductor 308 via a resistor 320 and the junction 314 being connected to the conductor 308 via a resistor 322. The collector of the intermediate amplifier 318 is connected to a junction 324 via a resistor 326, the junction 324 being connected to the conductor 308 via a resistor 328 and to the base of a switching transistor 330.

The emitter of the switching transistor 330 is connected to the conductor 308 and the collector of the switching transistor 330 is connected to the spring contact 215 of the indicator assembly 20a. The switching transistor 330 is thus connected to the indicator assembly 20a such that, in a biased "on" position of the switching transistor 330, the light emitting diode 224a is lighted or turned "on."

The base of the amplifier 80 is connected to the junction 304 via a conductor 332, a resistor 334 being interposed in the conductor 332 and the conductor 82 being connected to the base of the amplifier 80, generally between the resistor 334 and the amplifier 80. A resistor 336 is connected to the conductor 332, generally between the amplifier 80 and the resistor 334, the resistor 336 also being connected to the conductor 310. A resistor 338 is connected to the conductor 332, generally between the resistor 334 and the junction 304, the resistor 338 also being connected to the conductor 310. A capacitor 340 is connected to the junction 304 and to the conductor 310.

In the biased "on" position of the switching transistor 330, the light emitting diode 224a is switched "on" or lighted, as mentioned before, the current being applied in series through the light emitting diode 224a, the current limiting resistor 306 and the capacitor 340. The capacitor 340 essentially integrates the "on" period of time or duration of the light emitting diode 224a, since the capacitor 340 is being charged via the series circuit, described above, thereby providing an alternate network in lieu of the stepcharging type of function provided via the capacitor 186 of the direction finder 10.

The capacitors 84 and 340, the resistor 334 and the resistor 336 cooperate to bias or "hold" the amplifier 80 in the "on" position for a predetermined period of time or duration in a manner similar to that described before with respect to the capacitors 84 and 186, the resistor 184 and the resistor 190, the resistor 338 being utilized, in one form, to cooperate with a capacitor 340 having a larger capacitance value compared to the capacitor 186, shown in FIG. 1, to maintain the discharge time constant of the direction finder 10a substantially the same as the direction finder 10.

During the operation of the direction finder 10a, the switching transistor 330 is biased in the conducting or "on" position in the non-conducting or "off" position of the amplifier 80, the amplifier 80 being "held" in the conducting position via the actuator signal control assembly 22a comprising the capacitor 340 and the resistors 334, 336 and 338. The capacitor 84 also functions as a part of the actuator signal control assembly 22a, in a manner described before with respect to the direction finder 10.

The modified pulse generating assembly 50a of the modified signal generating assembly 18a, more particularly, includes the intermediate amplifier 318 and the switching transistor 330. The direction finder 10a thus does not include a multi-vibrator network, similar to the multi-vibrator network including the transistor amplifiers 108 and 110 of the direction finder 10.

Changes may be made in the construction and the arrangement of the parts or the elements of the embodiment as disclosed herein without departing from the spirit and the scope of the invention as defined in the following claims.

What is claimed is:

1. A direction finder for indicating the direction of predetermined transmitted signals, comprising:
    means for receiving the predetermined transmitted signals, the predetermined transmitted signals establishing a resultant amplitude variant signal having actuating null positions indicative of the direction of the received, predetermined transmitted signals, comprising:
        non-directional antenna means receiving the transmitted signals;
        directional antenna means receiving the transmitted signals; and
        means varying the position of the directional antenna means, the resultant amplitude variant signal being indicative of the effective amplitude of the transmitted signals received by the non-directional antenna means and the directional antenna means;
    signal generating means connected to the means receiving the predetermined transmitted signals and generating an actuator signal responsive to the actuating null positions of the resultant amplitude variant signal in a generating position of the signal generating means;
    actuator signal control means connected to the signal generating means holding the signal generating means in a generating position for a predetermined duration to control the duration of the actuator signal, comprising:
        sensing network means holding the signal generating means in a generating position for a predetermined duration for a predetermined maximum slope of the resultant amplitude variant signal; and
    indicator means connected to the signal generating means receiving the actuator signal and providing an indicator output responsive thereto, the indicator output being thereby indicative of the direction of the received, predetermined transmitted signals.

2. The direction finder of claim 1 wherein the actuator signal control means includes:
    regulating network means holding the signal generating means in a generating position for a predetermined duration for a predetermined minimum slope of the resultant amplitude variant signal, the regulating network means thereby cooperating with the sensing network means to maintain an actuator signal of a predetermined duration for resultant amplitude variant signals having slopes varying generally between the predetermined minimum slope and the predetermined maximum slope.

3. The direction finder of claim 2 wherein the signal generating means includes:
    pulse generating means, having an operating and a non-operating position, generating a pulse output signal for providing the actuator signal in an operating position thereof.

4. The direction finder of claim 3 wherein the signal generating means includes:
    amplifier means connected to the pulse generating means, having a conducting and a non-conducting position, receiving the predetermined transmitted signal and positioning the pulse generating means in an operating position in the actuating null positions of the resultant amplitude variant signal of the predetermined transmitted signal received thereby; and
    wherein the sensing network means and the regulating network means are each connected to the amplifier means for holding the amplifier means in a position positioning the pulse generating means in a generating position in the actuating null positions of the resultant amplitude variant signal.

5. The direction finder of claim 4 wherein the sensing network means includes:
    capacitor-resistor network means connected to the amplifier means having a relatively long time-constant.

6. The direction finder of claim 5 wherein the regulating network means includes:
    capacitor means connected to pulse generating means, the capacitor means being charged by the pulse output signal of the pulse generating means;
    step charge capacitor means connected to the amplifier means and to the pulse generating means, the step charge capacitor means being charged by the pulse output signal of the pulse generating means; and
    diode means interposed between the capacitor means and the step charge capacitor means providing a charge path for charging the capacitor means and the step charge capacitor means during one portion of the pulse output signal and providing a discharge path for discharging the capacitor means during one other portion of the pulse output signal to position the amplifier means in a position positioning the pulse generating means in a non-operating position.

7. The direction finder of claim 6 defined further to include:
    switching means interposed between the signal generating means and the indicator means, having an on position and an off position, the switching means receiving the pulse output signal of the pulse generating means and having an output signal in response thereto corresponding to the actuator signal; and wherein the capacitor means and the step charge capacitor means are each defined further as being connected to the switching means, the switching means controlling the charging of the capacitor means and the step charge capacitor means and the discharging of the capacitor means.

8. The direction finder of claim 3 wherein the pulse generating means includes a pair of amplifier means connected to form a free running multi-vibrator means providing the pulse output signal, each amplifier means of the pulse generating means having a forward bias in an operating position thereof; and wherein the amplifier means reverse biases one of the amplifier means of the pulse generating means in a conducting position of the amplifier means; and wherein the charging of the step charge capacitor means biases the amplifier means in the conducting position thereof.

9. The direction finder of claim 1 wherein the indicator means includes:
light means connected to the signal generating means, the light means lighted by the actuator signal in a generating position of the signal generating means; and
means to rotate the light means.

10. The direction finder of claim 9 wherein the means to rotate the light means includes: a disc having the light means connected thereto; an indicator shaft having a portion thereof connected to the disc, the indicator shaft rotating the disc and the light means in a rotating position thereof; and motor means gearingly connected to the indicator shaft and rotating the indicator shaft in an actuated position thereof; and wherein the means to rotate the directional antenna means includes, an antenna shaft, the antenna shaft gearingly connected to the motor means and rotatably driven thereby.

11. A direction finder for indicating the direction of predetermined transmitted signals, comprising:
means for receiving the predetermined transmitted signals, the predetermined transmitted signals establishing a resultant amplitude variant signal having actuating null positions indicative of the direction of the received, predetermined transmitted signals;
signal generating means connected to the means receiving the predetermined transmitted signals and generating an actuator signal responsive to the actuating null positions of the resultant amplitude variant signal in a generating position of the signal generating means;
actuator signal control means connected to the signal generating means holding the signal generating means in a generating position for a predetermined duration to control the duration of the actuator signal;
indicator means connected to the signal generating means receiving the actuator signal and providing an indicator output responsive thereto, the indicator output being thereby indicative of the direction of the received, predetermined transmitted signals;

tuning network means connected to the means receiving the transmitted signals tunable to various positions, each position corresponding to a selected, predetermined transmitted signal;

receiver network means connected to the tuning network means receiving, amplifying and detecting the selected, predetermined transmitted signals therefrom;
audio output network means connected to the receiver means receiving the amplified, predetermined transmitted signals therefrom and providing an audio output responsive thereto, in one position of the direction finder;
power supply means connected to the signal generating means; the actuator control means and the indicator means; and
switch means interposed between the power supply means and the signal generating means, the actuator control means and the indicator means, having a direction finder function position and a radio receiving function position, the power supply means connected to the audio output network means and the receiver network means in a radio receiving function position of the switch means, the power supply means connected to the receiver means, the signal generating means, the actuator control means and the indicator means in a direction finder function position of the switch means.

12. A direction finder for indicating the direction of predetermined transmitted signals, comprising:
means for receiving the predetermined transmitted signals, the predetermined transmitted signals establishing a resultant amplitude variant signal having actuating null positions indicative of the direction of the received, predetermined transmitted signals;
signal generating means connected to the means receiving the predetermined transmitted signals and generating an actuator signal responsive to the actuating null positions of the resultant amplitude variant signal in a generating position of the signal generating means, comprising:
switching transistor means having a conducting position; and
amplifier means connected to the switching transistor means, having a non-conducting position, receiving the transmitted signals and positioning the switching transistor means in the conducting position in the actuating null positions of the resultant amplitude variant signal of the transmitted signals received thereby;
actuator signal control means connected to the amplifier means of the signal generating means holding the amplifier means in a non-conducting position thereby holding the signal generating means in a generating position for a predetermined duration to control the duration of the actuator signal; and indicator means connected to the signal generating means receiving the actuator signal and providing an indicator output responsive thereto, the indicator output being thereby indicative of the direction of the received, predetermined transmitted signals, comprising:
a light emitting diode connected to the switching transistor means, the switching transistor means lighting the light emitting diode in a conducting position of the switching transistor means.

* * * * *